United States Patent
Paar et al.

(10) Patent No.: US 10,253,206 B2
(45) Date of Patent: Apr. 9, 2019

(54) WATERBORNE CURING COMPOSITIONS FOR ELECTRODEPOSITION AND RADIATION CURING

(71) Applicants: Allnex Austria GmbH, Werndorf (AT); Allnex Belgium S.A., Drogenbos (BE)

(72) Inventors: Willibald Paar, Graz (AT); Michel Tielemans, Wemmel (BE); Stephan Peeters, Heverlee (BE)

(73) Assignees: ALLNEX BELGIUM S.A., Drogenbos (BE); ALLNEX AUSTRIA GMBH, Werndorf (AT)

( * ) Notice: Subject to any disclaimer, the term of this patent is extended or adjusted under 35 U.S.C. 154(b) by 0 days.

(21) Appl. No.: 15/030,929

(22) PCT Filed: Oct. 23, 2014

(86) PCT No.: PCT/EP2014/072710
§ 371 (c)(1),
(2) Date: Apr. 21, 2016

(87) PCT Pub. No.: WO2015/062953
PCT Pub. Date: May 7, 2015

(65) Prior Publication Data
US 2016/0244631 A1 Aug. 25, 2016

(30) Foreign Application Priority Data
Oct. 31, 2013 (EP) .................... 13191006

(51) Int. Cl.
| | |
|---|---|
| *C08G 18/62* | (2006.01) |
| *C08G 18/64* | (2006.01) |
| *C09D 5/44* | (2006.01) |
| *C08F 283/10* | (2006.01) |
| *C09D 175/14* | (2006.01) |
| *C25D 13/18* | (2006.01) |
| *C09D 163/00* | (2006.01) |
| *C25D 13/22* | (2006.01) |
| *C08G 18/67* | (2006.01) |
| *C08G 18/79* | (2006.01) |
| *C09D 175/16* | (2006.01) |
| *C08G 59/17* | (2006.01) |
| *C08G 59/14* | (2006.01) |
| *C08G 59/18* | (2006.01) |
| *C09D 163/10* | (2006.01) |

(52) U.S. Cl.
CPC .......... *C09D 163/00* (2013.01); *C08F 283/10* (2013.01); *C08G 18/672* (2013.01); *C08G 18/792* (2013.01); *C08G 59/1466* (2013.01); *C08G 59/1477* (2013.01); *C08G 59/1494* (2013.01); *C08G 59/184* (2013.01); *C09D 5/4438* (2013.01); *C09D 5/4492* (2013.01); *C09D 163/10* (2013.01); *C09D 175/16* (2013.01); *C25D 13/22* (2013.01); *C08L 2205/05* (2013.01)

(58) Field of Classification Search
CPC .. C09D 163/00; C09D 175/16; C09D 5/4438; C09D 5/4492; C09D 175/14; C08G 18/792; C08G 18/672; C08G 18/643; C08G 16/6229; C25D 13/22; C08F 283/10
See application file for complete search history.

(56) References Cited

U.S. PATENT DOCUMENTS

| | | | |
|---|---|---|---|
| 4,251,415 A * | 2/1981 | Nakada | C08G 18/69 523/414 |
| 4,294,741 A | 10/1981 | Bosso | |
| 4,335,028 A | 6/1982 | Ting et al. | |
| 4,659,800 A * | 4/1987 | Daimer | C08G 59/14 204/501 |
| 4,742,097 A | 5/1988 | Turpin et al. | |
| 5,268,256 A | 12/1993 | Goetz et al. | |
| 5,595,859 A | 1/1997 | Olson et al. | |
| 6,087,417 A * | 7/2000 | Stevenson | C08G 59/1433 427/386 |
| 6,232,364 B1 * | 5/2001 | Fukuda | C08F 2/48 427/508 |

FOREIGN PATENT DOCUMENTS

| | | | | |
|---|---|---|---|---|
| JP | 05-239162 | * | 9/1993 | ............ C08F 283/10 |

OTHER PUBLICATIONS

International Search Report dated Jan. 7, 2015 in International Application No. PCT/EP2014/072710.

* cited by examiner

*Primary Examiner* — Jessica M Roswell
(74) *Attorney, Agent, or Firm* — Wenderoth, Lind & Ponack, L.L.P.

(57) ABSTRACT

The present invention relates to waterborne curing compositions for electrodeposition and radiation curing and processes to obtain such compositions. The compositions are characterized in that an ethylenically unsaturated compound (b), is dispersed in an aqueous solution by an at least partially neutralized (meth)acrylic modified amine epoxy adduct. The compositions of the invention are particularly suitable for coating metallic materials and temperature sensitive materials such as electrically conductive plastic materials.

13 Claims, No Drawings

WATERBORNE CURING COMPOSITIONS FOR ELECTRODEPOSITION AND RADIATION CURING

TECHNICAL FIELD

The present invention relates to waterborne curing compositions for electrodeposition and radiation curing and to processes for manufacturing such compositions. The compositions are particularly suitable for formulation of water-dilutable primers and one-coat paints which can be deposited cathodically and cured by radiation, more in particular UV radiation.

BACKGROUND

The application of a coating by means of electrodeposition is known. Electrodeposition is a known coating method which comprises dipping an electrically conductive material to be coated into a suspension of a charged film-forming material dispersed in water, and subjecting the conductive material to electrocoagulation by the passage of electric current through the suspension, and carrying out a baking treatment of the conductive material coated with the electrocoagulation.

Electrodeposition has major advantages in that the loss of coating material is low; the process is easily automated and controlled thereby reducing labor costs; a variety of materials to be coated can be treated simultaneously; uniform film formation is possible in the inside and edge of the materials to be coated; and coating materials have good adhesiveness to the materials to be coated. Waterborne coating materials have an improved ecological profile and are preferred in view of environmental pollution and disaster prevention.

The actual coating process usually involves submerging the part to be coated into a container which holds the coating bath or solution and applying direct current electricity through the bath using electrodes. Typically voltages of 25-400 volts DC are used. The object to be coated is one of the electrodes, and a set of "counter-electrodes" are used to complete the circuit.

After deposition, the object is normally rinsed to remove the undeposited bath. The rinse is followed by a baking or curing process. This will crosslink the polymer and allows the coating to flow out and become smooth and continuous.

The process is useful for applying materials to any electrically conductive surface. Consequently cationic electrodeposition is widely employed as coating method in the car industry as a coating method for car bodies. However for heat-sensitive materials such as metalised plastics, coating compositions with a thermosetting temperature above 100° C. cannot be used.

In order to solve this problem, there is a method for coating materials using ultraviolet radiation. This method employs coating compositions with radiation curable, preferably UV curable or electron beam curable, oligomers, monomers, photo polymerization initiators, radical inhibitors. In these solventless coating materials, the reactive monomer is used for diluting other components in place of an organic solvent and thus becomes part of the cross-linked polymer network after radical polymerization. Cured coating film produced from this type of coating material is very hard, but fragile and less adhesive to the base material, which is particularly problematic on a smooth surfaced base material.

Coating compositions have been described which contain both electrodepositable and radiation curable properties. A problem however is that the energy curable part has poor solubility in water. It is therefore problematic to obtain a composition with good dispersibility.

U.S. Pat. No. 6,232,364 discloses the use of two or more carefully selected species of photo initiators in order to prevent this phenomenon. However this selection process is tedious. A more robust and less critical method is sought for.

There remains a need in the art for improved coating compositions, especially for heat sensitive materials, and for their manufacturing processes.

The present invention aims to resolve at least some of the problems mentioned above. The invention thereto aims to provide coating compositions for electrodeposition and radiation curing with high reactivity, low tackiness, good adhesion, high anticorrosion, and high gloss. It is a further object of the invention that the coating compositions are suitable for coating heat-sensitive materials such as plastics.

SUMMARY OF THE INVENTION

The present invention provides compositions for low temperature radiation curable electro-deposition with improved dispersibility, and a process for manufacturing the compositions.

In particular, the invention in a first aspect provides a radiation curable electrodepositable coating composition (a)+(b), comprising an aqueous dispersion of:
  (i) a dispersing polymer (a) consisting essentially of an at least partially neutralized (meth)acrylic modified amine epoxy adduct, and
  (ii) an ethylenically unsaturated compound (b), and
  (iii) optionally a photo initiator (c).

In a second aspect, the invention provides a process for the preparation of a non-aqueous water-dilutable composition (AB)+(b) for the preparation of an aqueous coating composition (a)+(b) which can be deposited cathodically and is curable by radiation, comprising the steps of:
  bringing an ethylenically unsaturated compound (b) together with a (meth)acrylic modified amine epoxy adduct material (AB) comprising 20-95 wt %, preferably 50-95 wt %, more preferably 70-95 wt % (meth)acrylic monomer content based on the total monomer content of (AB) with an amine number of 20-150 mg KOH/g in a non-aqueous water-dilutable solvent (d),
  optionally adding a photo initiator (c1),
    using an amount from 20 to 80 wt % of compound (AB) and from 80 to 20 wt % of compound (b), expressed relative to the total weight of the compounds (AB) and (b),
  wherein the (meth)acrylic modified amine epoxy adduct material (AB) is preferably prepared as follows based on an epoxy resin-amine adduct (A) and a (meth)acrylate copolymer (B):
    (A) 3 to 50%, preferably 3 to 30%, by weight, based on the solids, of a basic adduct of epoxy resins, which has an amine number of 50 to 170 mg KOH/g and is present, preferably as a 10 to 40% strength by weight solution, in a non-aqueous, preferably, water-dilutable solvent which is inert to the reaction (component A), and
    (B) 50 to 97%, preferably 70 to 97%, by weight of a monomer mixture which comprises
      (Ba) 7 to 20% by weight of esters of (meth)acrylic acid which contain secondary or tertiary amino groups, (Bb) 15 to 30% by weight of monoesters of (meth)acrylic acid with diols, which contain alkylene radicals having 2 to 6 carbon atoms and/or oxyalkylene radicals having 4 to 12 carbon atoms, (Bc) 50 to 78% by weight of (meth)acrylic acid alkyl esters, the alkyl radicals of which contain 1 to 18 carbon atoms, and (Bd) up to 10% by weight of aromatic vinyl monomers (component B), are subjected to free radical polymerization, and the combination (AB) thus obtained is at least partially neutralized thereby providing (a), with the provisos that component (AB) has an amine number of 20-150 mg KOH/g, preferably of 30 to 90 mg KOH/g and a hydroxyl number of 80 to 150 mg KOH/g, and that the sums of the percentage figures of components (A) and (B), respectively (Ba) to (Bd), are in each case 100.

In a third aspect, the invention provides a process for the preparation of an aqueous coating composition (a)+(b) which can be deposited cathodically and cured by ultraviolet radiation, comprising the steps of:

preparing a non-aqueous water-dilutable composition (AB)+(b) according to an embodiment of the process previously described, optionally adding a photo initiator (c2), which can be the same or different from the photo initiator (c1) added to prepare the water-dilutable composition (AB)+(b), at least partially neutralizing the amino groups of (AB), preferably using an acid, thereby providing (a), diluting the combination (a)+(b) thus obtained with deionized water to a solids content suitable for further processing.

In a fourth aspect, the invention provides compositions prepared according to a process of the invention.

In a final aspect, the invention provides uses of an inventive composition for coating metallic materials, metal plated materials and electrically conductive plastic materials as well as to a process for coating metallic materials, metal plated materials and electrically conductive plastic materials wherein a coating is formed on said material by electrodeposition in a bath containing a composition according to the invention, the coated material is withdrawn from the bath, optionally rinsed with water or a solvent, optionally dried at a temperature of preferably from 60 to 100° C., and then further submitted to radiation curing.

Preferred embodiments are as specified in the dependent claims.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

By the term "aqueous" as used herein, is meant that the solvent used in the composition is mainly water. Hence, "aqueous" and "water-based" may be considered synonyms. Water-based formulations generally have the advantage that they require little or no organic solvent fraction. Note that water is not considered a solvent in the present application. It is considered the dispersing phase.

The inventors have found a resin combination wherein a water dispersible cationic component acts as dispersing polymer for a second radiation curable component. In addition, the resulting composition was found to have a decreased dependence on the presence of a photo initiator.

In particular, the present invention provides in a first aspect, a radiation curable electrodepositable coating composition, comprising an aqueous dispersion of: (i) a dispersing polymer (a) consisting essentially of an at least partially neutralized (meth)acrylic modified amine epoxy adduct, and (ii) an ethylenically unsaturated compound (b). The combination presented above has the advantage that the dispersibility of (b) in water is improved in the presence of compound (a).

By (meth)acrylic modified amine epoxy adduct is understood in the present invention a blend and/or the reaction product of an amine epoxy adduct with at least one (meth)acrylic (co)polymer which is obtained by polymerizing at least one (meth)acrylic monomer which in the presence of the amine epoxy adduct to form an (meth)acrylic (co) polymer.

In the present invention, the term "(meth)acryl" is to be understood as to encompass both acryl and methacryl compounds or derivatives as well as mixtures thereof.

By amine epoxy adduct is understood in the present invention the reaction product of at least one epoxy compound comprising at least two epoxy groups with at least one amine compound comprising at least one amine group.

In order to be able to act as a dispersing polymer, the (meth)acrylic modified amine epoxy adduct comprises at least one functional group which enables to obtain a dispersion in water. Such functional groups are well known in the art. In case of cationic electrodeposition coating compositions, this functional group is a moiety that is or is able to form a cationic group upon dispersion in water, optionally after neutralization with an acid.

In a preferred embodiment the radiation curable electrodepositable coating composition, comprises an aqueous dispersion of: (i) a dispersing polymer (a) consisting essentially of an at least partially neutralized (meth)acrylic modified amine epoxy adduct comprising 20-95 wt % (meth)

acrylic monomer content based on the total monomer content of (a) with an amine number of 20-150 mg KOH/g, and (ii) an ethylenically unsaturated compound (b).

In a preferred embodiment, the amine number of the dispersing polymer is 30-140 mg KOH/g, more preferably 40-120 mg KOH/g. In a preferred embodiment, the at least partially neutralized (meth)acrylic modified amine epoxy adduct comprises 50-95 wt % polymer derived from (meth) acrylic monomer based on the total monomer content of (a).

In a preferred embodiment the dispersion comprising (a), (b) and optionally (c1) and (c2), has a particle size of below 250 nm, preferably below 200 nm, more preferably below 180 nm. In another preferred embodiment the dispersion has a particle size above 50 nm, preferably above 100 nm. More preferably above 140 nm, even more preferably above 145 nm, most preferably above 150 nm. In a most preferred embodiment the dispersion has a particle size between 50 nm and 250 nm, preferably between 100 nm and 230 nm, more preferably between 150 nm and 200 nm, most preferably between 155 and 180 nm.

By the term "particle size" as used herein, is meant the average mean particle size d50 as measured on the aqueous dispersion with a Malvern Zetasizer.

The presence of a photo initiator (c) in the composition is optional. It was found that the composition does not require an initiator to be present in order to obtain curing. This is of interest as prior art disclosures, such as U.S. Pat. No. 6,232,364, have shown that the presence and selection of suitable initiators for the compositions described therein is essential to obtaining a good curing. Hence, a composition according to the invention provides for a less critical, more robust composition for use in a coating process.

The polymerization reaction induced by radiation chemistry or curing is preferably carried out by means of radiation with a wavelength of less than 400 nm, such as UV, electron, X- or gamma rays. UV radiation is particularly preferred, the curing with UV radiation often being initiated in the presence of photo initiators.

The photo-initiator encompasses any molecule capable to initiate a radical poly-addition reaction of the (meth)acrylate-functional components by the action of light.

In a preferred embodiment, said photo initiator is selected from the list of a benzophenone; 1-hydroxy-cyclohexyl phenyl ketone; 2,4,6-trimethyl benzophenone; 3,3-dimethyl-4-methoxy-benzophenone; benzyl dimethyl ketal; oligo (2-hydrox-2-methyl-1-(4-(1-methyl-vinyl)phenyl)propanone; 2,2-dimethoxy-1,2-diphenylethan-1-one; 2-hydroxy-2-methyl-1-phenylpropan-1-one; bis (2,4,6-trimethylbenzoyl)pheny phosphine oxide; 2,4-diethylthioxanthoine; ethyl p-dimethylaminobenzoate; isoamyl p-dimethylaminobenzoate; bis (n$^5$-2,4-cyclopentadien-1-yl)-bis(2,6-difluoro-3-(1H-pyrrol-1-yl)-phenyl) titanium or mixtures thereof. In a more preferred embodiment, said photo initiator is selected from the list of a benzophenone and 1-hydroxy-cyclohexyl phenyl ketone, or mixtures thereof. Mixtures can provide eutectic compositions that are advantageously liquid at room temperature.

The photoinitiator (c1) or (c2) can be added to the composition comprising (b) before the dispersion in water and before or after the neutralization in order to form (a) and (b). The photoinitiator (c1) or (c2) is preferably added after the neutralization, more preferably just before the use of the composition for coating substrates.

In a preferred embodiment, an amount from 20 to 80 wt % of compound (a) and from 80 to 20 wt % of compound (b), expressed relative to the total weight of the compounds (a) and (b) is used. When the amount of (a) is increased above 70 wt %, crosslinking goes down. In a more preferred embodiment, an amount from 30 to 70 wt % of compound (a) and from 70 to 30 wt % of compound (b), expressed relative to the total weight of the compounds (a) and (b) is used. In a most preferred embodiment, an amount from 40 to 60 wt % of compound (a) and from 60 to 40 wt % of compound (b), expressed relative to the total weight of the compounds (a) and (b) is used.

In a preferred embodiment, compound (a) comprises epoxy resin-amine adducts (component A) and (meth)acrylate copolymers (component B), more specifically 3 to 50% by weight, more preferably 3 to 30% by weight, of (A) and 50 to 97% by weight, more preferably 70 to 97% by weight, of (B), expressed as % by weight of the solids content provided by (A) and (B).

In a preferred embodiment, compound (a) is obtainable from a process wherein 50 to 97%, more preferably 70 to 97%, by weight of (meth)acrylic monomers are subjected to free radical polymerization in the presence of 3 to 50%, more preferably 3 to 30%, by weight of an epoxy resin-amine adduct (component A) in order to form (meth)acrylic modified amine epoxy adduct (AB) comprising a blend and/or the reaction product of (meth)acrylate copolymer (component B) and component A. The sum of the percentages of the (meth)acrylic monomers forming component (B) and component (A) are 100.

Said epoxy resin-amine adduct (A) is preferably a basic amine epoxy adduct of epoxy resins, which contains at least one amino group per molecule and has an amine number of 50 to 170 mg KOH/g, preferably 90 to 130 mg KOH/g.

In a preferred embodiment of this component A at least 5% by weight, preferably 10 to 20% by weight, of aliphatic moieties, are present, preferably as end or side chains, which have 7 to 18 carbon atoms and are identical to the aliphatic moieties likewise present in component (B).

In a preferred embodiment of a composition according to the invention, components (A) and (B) in each case comprise at least 5% by weight of identical aliphatic moieties having 7 to 18 carbon atoms. Due to the presence of a content of identical aliphatic moieties having 7 to 18 carbon atoms in each of components (A) and (B), and the resulting compatibility, the properties of the baked films based on the products prepared according to the invention, can be optimized. These properties may include degree of gloss, UV resistance, weathering resistance, washing agent resistance and corrosion resistance.

The C7-C18 aliphatic moieties are preferably introduced into component (A) by using alkylamines, such as 2-ethylhexylamine or stearylamine, and/or by reaction of corresponding alkyl glycidyl ethers and/or alkyl glycidyl esters with primary and/or secondary amino groups of epoxy resin-amine adducts. The aliphatic moieties can also be incorporated by reaction of diisocyanates which are semi-blocked or half-blocked by fatty alcohols and/or fatty amines with hydroxyl and/or amino groups of the epoxy resin-amine adducts. There is furthermore the possibility of introducing fatty alcohols or fatty acids into component (A) by esterification, or of reacting alkyl glycidyl ethers and/or alkyl glycidyl esters with carboxyl groups. Compounds which carry corresponding side chains, such as are described, for example, in U.S. Pat. No. 4,992,516, can also be used to lengthen aromatic epoxy resins. Epoxy resin-amine adducts based on aromatic and aliphatic diepoxy resins or other epoxide compounds, and modifications thereof, are described in the literature.

A solution of component (A) in a solvent which is inert in the subsequent polymerization but which is preferably water-dilutable, such as in alkanols, glycol ethers or glycol esters, serves as the reaction medium for the preparation of component (B). By the term water-dilutable is meant to designate in the present invention a solvent that permits to form a homogeneous, single phase mixture when the compound is mixed with water over a concentration range of at least 30% of water in the total mass of water and the solvent.

In this preparation, a monomer mixture which comprises (Ba) 7 to 20% by weight of esters of (meth)acrylic acid which contain secondary or tertiary amino groups; preferably tertiary amino groups, (Bb) 15 to 30% by weight of monoesters of (meth)acrylic acid with diols, which contain alkylene radicals having 2 to 6 carbon atoms and/or oxyalkylene radicals having 4 to 12 carbon atoms, (Bc) 50 to 78% by weight of (meth)acrylic acid alkyl esters, the alkyl radicals of which contain 1 to 18 carbon atoms, and (Bd) up to 10% by weight of aromatic vinyl monomers, preferably styrene, wherein the sum of the percentage figures of (Ba) to (Bd) must be 100, is subjected to free radical polymerization in the solution of component (A) in a known manner.

According to the invention, the reaction mixture (AB) of components (A) and (B) consists of 3 to 50% by weight, preferably of 3 to 30% by weight, more preferably 5 to 20% by weight, based on the solids, of component (A) and 50 to 97% by weight, preferably 70 to 97% by weight, more preferably 80 to 95% by weight, of component (B), wherein the sum of the percentage figures of (A) and (B) must likewise be 100.

The starting substances are furthermore chosen in a ratio of amounts such that the components (AB) have an amine number of 20 to 150 mg KOH/g, preferably 30 to 90 mg KOH/g, more preferably 40 to 70 mg KOH/g; and a hydroxyl number of 80 to 150 mg KOH/g.

N-monoalkyl- and/or N-dialkyl-aminoalkyl (meth)acrylates and/or the corresponding N-alkanol compounds are preferably employed as monomers (Ba) which contain nitrogen groups. If other such monomers are used, the desired profile of properties in respect to yellowing, adhesive strength, elasticity of the films must be taken into account.

When choosing the monomers of group (Bb) and (Bc), it may be necessary to take into account the preferred requirement according to the invention that the monomer mixture preferably has a composition such that at least 5% by weight, preferably 10 to 20% by weight, of aliphatic moieties having 7 to 18 carbon atoms which are identical to the radicals present in component (A) are present. This embodiment has the advantage that improved dispersibility is provided.

In a preferred embodiment, component (AB) has been subjected to partial neutralization of the amino groups with an acid before mixing with component (b) to provide (a). Said acid is preferably selected from the list formic acid, acetic acid, lactic acid, or mixtures thereof. The addition of more water, apart from its introduction for the neutralization of the amino groups, is avoided in view of the poor water solubility of the component (b).

Therefore, in a more preferred embodiment, component (AB) is subjected to at least partial neutralization of the amino groups with an acid only after mixing with component (b) to provide (a)+(b).

Prior to mixing of (AB) with (b), some of the auxiliary solvent employed may be removed first. In case an auxiliary solvent is used which is incompatible with water, such as ketones or aromatics, it needs to be removed first prior to adding water.

The non-aqueous water-dilutable compositions obtainable as described above are then used for the preparation of aqueous coating compositions.

The at least partially neutralized (meth)acrylic modified amine epoxy adduct material (a), present in a non-aqueous water dilutable solvent (d) is brought together with an ethylenically unsaturated compound (b) using an amount from 20 to 80 wt % of compound (a) and from 80 to 20 wt % of compound (b), expressed relative to the total weight of the compounds (a) and (b). Optionally a photo initiator (c) is added. In a preferred embodiment an amount of 30 to 70 wt % of compound (a) and from 70 to 30 wt % of compound (b); more preferably an amount of from 40 to 60 wt % (a) and from 60 to 40 wt %; most preferably an amount of 50 wt % (a) and 50 wt % of (b) is used, expressed relative to the total weight of the compounds (a) and (b).

In the context of the present invention a wide variety of ethylenically unsaturated compounds (b) can be used. Typically they are (meth)acrylated compounds. Often these compounds (b) have a weight average molecular weight ranging 200-20000 Daltons, preferably 300-5000 Daltons, more preferably 400-4000 Daltons, most preferably 500-2000 Daltons.

In general, the amount of (meth)acrylic functionality of compounds (b) is between 1 and 10 meq/g, typically between 5 and 10 meq/g, most typically between 7 and 10 meq/g.

In a preferred embodiment of a composition according to the invention, (b) is selected from one or more of urethane (meth)acrylate(s) (b1), polyester (meth)acrylate(s) (b2), polyepoxy (meth)acrylate(s) (b3), polycarbonate (meth)acrylate(s) (b4), polyether (meth)acrylate(s) (b5), and polyacrylic (meth)acrylate(s) (b6); preferably urethane (meth)acrylate(s) (b1), polyester (meth)acrylate(s) (b2) and/or polyepoxy (meth)acrylate(s) (b3).

In a preferred embodiment of a composition according to the invention, (b) is a urethane (meth)acrylate (b1) that are generally based on an aliphatic or an aromatic polyisocyanate, possibly a mixture of both. Urethane (meth) acrylates and in particular urethane acrylates are preferred as they give good adhesion in different substrates and provide good corrosion resistance. Urethane acrylates offer a higher (meth)acrylate functionality with a good balance of properties in the cured film as well as the beneficial presence of urethane hard segments prone to coating reinforcement by hydrogen bonding.

Urethane (meth)acrylates (b1) typically are obtained from the reaction of at least one polyisocyanate (i), at least one polymerizable ethylenically unsaturated compound (ii) containing at least one reactive group capable to react with isocyanate groups, and optionally at least one other compound (iii) that contains at least one reactive group capable to react with isocyanate groups. By "other" is meant that compounds (iii) are different from compounds (ii). The "reactive groups capable to react with isocyanate groups" are usually hydroxyl groups; amino groups and/or thiol groups can also be used to provide additional urea and thio-urea functions.

By a polyisocyanate (i) is meant to designate a compound containing at least two isocyanate groups. Typically the polyisocyanate contains not more than six isocyanate groups, more preferably not more than three isocyanate groups. Most typically it is a diisocyanate. The polyisocyanate is generally selected from aliphatic, cycloaliphatic, aromatic and/or heterocyclic polyisocyanates, or combinations thereof. Most typically (cyclo)aliphatic and/or aromatic polyisocyanates are used.

Examples of aliphatic and cycloaliphatic polyisocyanates that may be used are: 1,6-diisocyanatohexane (HDI), 1,1'-methylene bis[4-isocyanatocyclohexane] (H12MDI), 5-isocyanato-1-isocyanatomethyl-1,3,3-trimethylcyclohexane (isophorone diisocyanate, IPDI). Aliphatic polyisocyanates containing more than two isocyanate groups are for example the derivatives of above mentioned diisocyanates like 1,6-diisocyanatohexane biuret and trimer. Examples of aromatic polyisocyanates that may be used are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5-naphtalene diisocyanate (NDI), tolidine diisocyanate (TODI) and p-phenylene diisocyanate (PPDI).

The amount of polyisocyanate compound (i) used for the synthesis of the urethane (meth)acrylate (b1) is generally in the range of from 10 to 70 percent by weight (wt %), preferably from 15 to 60 wt % and more preferably from 20 to 50 wt %. Weight percentages are herein relative to the total weight of compounds used to prepare urethane (meth)acrylates (b1).

Compounds (ii) typically are (meth)acrylated compounds. Most often they are (meth)acrylated compounds containing essentially one reactive group capable to react with isocyanate groups. Such compounds typically comprise at least one unsaturated function such as acrylic or methacrylic groups and one nucleophilic function capable of reacting with isocyanate. This can be a hydroxyl, amino and/or thiol group, but typically is a hydroxyl group.

Typically compounds (ii) are hydroxyl functional (meth)acrylates and more in particular (meth)acryloyl mono-hydroxy compounds, or compounds comprising one hydroxyl group and one or more (meth)acryloyl groups. Acrylates are particularly preferred.

Suitable are for instance the esterification products of aliphatic and/or aromatic polyols with (meth)acrylic acid having a residual average hydroxyl functionality of about 1.

Examples of suitable hydroxyl functional (meth)acrylates (ii) include but are not limited to hydroxyethyl (meth)acrylate, hydroxypropyl (meth)acrylate, hydroxybutyl (meth)acrylate, polyethyleneoxide mono(meth)acrylate, polypropyleneoxide mono(meth)acrylate, or any of those hydroxylated monomers further reacted with lactones or lactides which add to these hydroxyls in a ring-opening reaction.

Suitable are also the esterification products of aliphatic and/or aromatic polyols with (meth)acrylic acid having a residual average hydroxyl functionality of about 1 or higher. The partial esterification products of (meth)acrylic acid with tri-, tetra-, penta- or hexahydric polyols or mixtures thereof are preferred but it is also possible to use reaction products of such polyols with ethylene oxide and/or propylene oxide or mixtures thereof, or the reaction products of such polyols with lactones or lactides which add to these polyols in a ring-opening reaction until the desired residual hydroxyl functionality is reached. It is known to those skilled in the art that the (meth)acrylation of polyols proceeds to a mixture of (meth)acrylate components and that an easy and suitable way to characterize the mixture is by measuring its hydroxyl value (mg KOH/g). Suitable compounds (ii) are for instance the (meth)acrylic esters of linear and branched polyols in which at least one hydroxy functionality remains free. Particularly preferred are compounds comprising at least two (meth)acryl functions such as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents. Particularly preferred are pentaerythritol triacrylate (PETIA), a mixture containing essentially pentaerythritol diacrylate, pentaerythritol triacrylate and pentaerythritol tetraacrylate and a dipentaerythrytol hydroxypentaacrylate (DPHA), a mixture containing essentially dipentaerythritol tetraacrylate, dipentaerythritol pentaacrylate and dipentaerythritol hexaacrylate.

Also suitable are C1-4 hydroxyalkyl(meth)acrylate-((poly)lactone)t compounds, wherein t is an integer of from 1 to 10, preferably from 1 to 5. Preferably the (poly)lactone is a (poly)caprolactone. Examples of useful compounds in this category are Tone M100 (Dow Chemicals) and/or Bisomer PEMCURE 12A (Cognis). Other examples of suitable compounds (ii) are C1-4 hydroxyalkyl(meth)acrylate-((poly)lactide)n compounds, wherein n is an integer between 1 and 10, preferably n is between 1 and 5 and most preferably n is between 2 and 4.

Also suitable are the reaction products of (meth)acrylic acid with aliphatic, cycloaliphatic or aromatic compounds that bear an epoxy functionality and that, optionally, further bear at least one (meth)acrylic functionality. It is also possible to use compounds obtained from the reaction of an aliphatic, cycloaliphatic or aromatic compound containing at least one carboxylic acid with another compound bearing an epoxy functionality and at least one (meth)acrylic functionality. Particularly suitable is the reaction of the glycidyl ester of a C9-C11 versatic acid with (meth)acrylic acid.

From the above in particular poly(meth)acryloyl mono-hydroxy compounds, or compounds comprising one hydroxyl group and two or more (meth)acryloyl groups are preferred.

The amount of compounds (ii) used for the synthesis of the urethane (meth)acrylate (b1) is generally in the range of from 10 to 90 wt %, preferably from 40 to 85 wt % and more preferably from 50 to 80 wt %. Weight percentages are herein relative to the total weight of compounds used to prepare urethane (meth)acrylates (b1).

Optionally, other hydroxyl functional compounds (iii) can be used for preparing urethane (meth)acrylates (b1) of the invention. Compounds (iii) typically are polyols and more in particular diols. In general compounds (iii) are saturated polyols.

By polyol (iii) is meant to designate an organic compound comprising at least two hydroxyl groups. The polyol (iii) can be selected from low molecular weight polyols having a number average weight of less than 300, preferably less than 200 Daltons; from high molecular weight polyols having a number average molecular weight of at least 300, preferably at least 400, more preferably at least 500 Daltons; or from any mixtures thereof. The high molecular weight polyol (iii) preferably has a number average molecular weight of at most 5000, preferably at most 2000, more preferably at most 1000 Daltons.

Examples of suitable low molecular weight compounds (iii) include compounds like aliphatic or cycloaliphatic polyols such as ethyleneglycol (EG), propyleneglycol (PG), cyclohexane dimethanol (CHDM), glycerol (GLY), trimethylolpropane (TMP), ditrimethylolpropane (di-TMP), pentaerythrytol (PENTA), dipentaerythritol (di-PENTA), or any other renewable polyols like fatty dimer diols, and the like.

Examples of high molecular weight polyols (iii) are polyester polyols, polyether polyols, polycarbonate polyols, polybutadiene polyols, polyacrylate polyols and silicone polyols, as well as combinations thereof. Preferred are polyester polyols, polycarbonate polyols and/or polyether polyols, having a molecular weight above 500 Daltons.

Particularly preferred are polyhydroxylated polyester polyols. Examples of such compounds are well known in the art.

Where present, compounds (iii) are generally used in an amount from 1 to 95 wt %, preferably from 2 to 20 wt % more preferably from 3 to 10 wt %, and most preferably from 5 to 10 wt %. Weight percentages are herein relative to the total weight of compounds used to prepare urethane (meth)acrylates (b1).

In an embodiment of the invention, urethane (meth) acrylates are prepared from compounds (i), (ii) and the optional compound (iii) as identified above. Typically the sum of the weight percentages of compounds (i), (ii) and (iii) equals 100%. In an embodiment of the invention compounds (iii) are used to prepare urethane (meth)acrylates (b11) of the invention. In yet another embodiment of the invention, no compounds (iii) are used to prepare compounds (b1) according to the invention. Especially preferred are urethane (meth)acrylates (b12) that are obtained from the reaction of at least one polyisocyanate (i) and at least one polymerizable ethylenically unsaturated compound (ii) containing at least one reactive group capable to react with isocyanate groups as described above. Most typically urethane (meth)acrylates (b12) are the reaction product of a polyisocyanate (i) and an active hydroxyl-containing ethylenically-unsaturated compound (ii) having acrylate or methacrylate unsaturation. Typically the sum of the weight percentages of compounds (i) and (ii) herein equals 100%.

Typically urethane (meth)acrylates (b1) that are used in the invention have a molecular weight MW of between 400 and 20000 Daltons. Usually the MW is at most 5000 Daltons, typically at most 2000 Daltons, and most typically at most 1000 Daltons. Molecular weights can be measured by gel permeation chromatography using polystyrene standards but most typically they are calculated from the target molecule. Optionally urethane (meth)acrylates (b1) of the invention can have residual amounts of hydroxyl functions. In general the residual amount of hydroxyl functions is between 0 and 5 meq/g. Typically the residual amount of hydroxyl functions is at most 3 meq/g, more typically at most 1 meq/g. In a particular embodiment of the invention no residual hydroxyl functions are present. In general, the amount of (meth)acrylic functionality of (b) is between 1 and 10 meq/g, typically between 5 and 10 meq/g, most typically between 7 and 10 meq/g.

Examples of suitable urethane (meth)acrylates (b1) are those commercialized as EBECRYL® 1290, EBECRYL® 220, EBECRYL® 270, EBECRYL® 264, EBECRYL® 294/25HD, EBECRYL® 4883, EBECRYL® 5129 and EBECRYL® 8210. These urethane (meth)acrylates can be diluted in a reactive diluent or be used in combination with other (meth)acrylated compounds.

In another preferred embodiment of a composition according to the invention, (b) is selected from one or more polyester (meth)acrylate(s) (b2). This selection has the advantage that an improved film smoothness or flow is provided.

Polyester (meth)acrylates (b2) used in the invention typically are obtained from the reaction of at least one polyol (iii) and at least one ethylenically unsaturated carboxylic acid (iv) or a suitable equivalent. Examples of suitable compounds (iv) include (meth)acrylic acid, β-carboxyethyl (meth)acrylate, crotonic acid, iso-crotonic acid, maleic acid, fumaric acid, itaconic acid, citraconic acid, 3-(meth)acrylamido-3-methylbutanoic acid, 10-(meth)acrylamido-undecanoic acid, 2-(meth)acrylamido-2-hydroxyacetic acid, vinyl acetic acid and/or allyl acetic acid. Acrylic acid and methacrylic acid, used alone or in combination, are preferred.

Suitable polyester (meth)acrylates (b2) are for instance aliphatic or aromatic polyhydric polyols which have been totally esterified with (meth)acrylic acid and may contain a residual hydroxyl functionality in the molecule; an easy and suitable way to characterize the product is thus by measuring its hydroxyl value (mgKOH/g). Suitable are the partial or total esterification products of (meth)acrylic acid with di-, tri-, tetra-, penta- and/or hexahydric polyols and mixtures thereof. It is also possible to use reaction products of such polyols with ethylene oxide and/or propylene oxide or mixtures thereof, or reaction products of such polyols with lactones and lactides, which add to these polyols in a ring-opening reaction. Examples of poly-unsaturated compounds from this category are dipropyleneglycol di-acrylate, trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof. Partial acrylation products from these examples are also considered.

Polyester (meth)acrylates (b2) with a higher molecular weight, e.g. a MW above 500 Daltons, preferably above 750 Daltons, more preferably above 1000 Daltons, can also be obtained by reacting a hydroxyl group-containing polyester with (meth)acrylic acid, or by reacting a carboxylic acid group-containing polyester with a hydroxyalkyl (meth)acrylate such as for example 2-hydroxyethyl acrylate, 2- or 3-hydroxypropyl acrylate, etc., or with glycidyl (meth)acrylate. The polyester backbone can be obtained in a conventional manner by polycondensation of at least one mono- and/or polyhydroxy alcohol, such as ethylene glycol, propylene glycol, butanediol, neopentyl glycol, hexanediol, trimethylolpropane, bisphenol A, pentaerythritol, etc., or/and the ethoxylates and/or propoxylates thereof, with at least one mono- and/or polycarboxylic acid such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition polylactones and/or polylactides can be used as polyester backbone. For example poly(ε-caprolactone) obtained by ring-opening polymerization of ε-caprolactone, optionally in the presence of one or more polyhydroxy alcohol, can be used. In a particular embodiment of the invention the polyester (meth)acrylate (b2) is an alkyd, more in particular is a (meth)acrylated alkyd. In another embodiment of the invention the polyester (meth)acrylate (b2) is not an alkyd, more in particular is not a (meth)acrylated alkyd. By using an alkyd structure, it is possible to encompass its typical coating features like glossy finishes together with an increased content of renewable raw materials (fatty acids).

Typically polyester (meth)acrylates (b2) have a molecular weight MW of between 200 and 20000 Daltons. Usually the MW is at most 5000 Daltons, typically at most 1000 Daltons, most typically at most 500 Daltons.

Suitable polyester acrylates (b2) are for instance those commercialized as EBECRYL®800, EBECRYL®830 and EBECRYL®884.

In another preferred embodiment of a composition according to the invention, (b) is selected from one or more polyepoxy (meth)acrylate(s) (b3). This selection has the advantage that corrosion resistance is improved.

Polyepoxy (meth)acrylates (b3) that are used in the invention can be obtained from the reaction of (meth)acrylic acid, or the like as described above, with polyepoxides, i.e. compounds comprising at least two epoxide functions. The polyepoxides are generally chosen from glycidyl ethers of aromatic or aliphatic alcohols, polyols and from cycloaliphatic polyepoxides. Preferred epoxides are diglycidylethers of aromatic, aliphatic and/or cycloaliphatic diols, such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of pentanediol, diglycidylether of butanediol. Particularly preferred is diglycidyl ether of bisphenol-A. Also epoxidized unsaturated fatty acid triglycerides or epoxidized novolacs can be used. Examples include epoxidized soya oil, epoxidized castor oil, epoxidized linseed oil and the like.

Polyether (meth)acrylates (b4) that are used in the invention can be prepared by esterification of hydroxyfunctional polyethers with an ethylenically unsaturated carboxylic acid like (meth)acrylic acid. For more examples—see compounds (iv) above. The polyether can be a random or a bloc copolymer (usually dibloc or tribloc).

Hydroxyfunctional polyethers are obtained by ring-opening homo- or copolymerization of cyclic ethers such as tetrahydrofuran, ethylene oxide and/or propylene oxide or can be prepared by reacting polyhydroxy alcohols with ethylene and/or propylene oxide. Polycarbonate (meth)acrylates (b5) that are used in the invention can be prepared by esterification of hydroxyfunctional polycarbonates with an ethylenically unsaturated carboxylic acid like (meth)acrylic acid like. For more examples—see compounds (iv) above.

Poly(meth)acrylic (meth)acrylates (b6) that are used in this invention can be prepared by the radical polymerization of (meth)acrylic monomers in the presence of thermal radical initiators, transfer agents and optional solvents; a chemical functionality is introduced on the acrylic backbone to ensure the subsequent grafting with suitable mono- or poly-(meth)acrylated compounds. For example, the (meth) acrylic oligomer bears carboxylic acid functionality and is grafted with glycidyl (meth)acrylate (or vice versa). Suitable (meth)acrylated (meth)acrylics of this type are commercialized as EBECRYL®1200.

In one particular embodiment, compositions of the invention comprise at least one urethane (meth)acrylate (b1) as described above, and optionally at least one polyester (meth) acrylate (b2) as described above.

In another particular embodiment, compositions of the invention comprise at least one polyester (meth)acrylate (b2) as described above.

In yet another particular embodiment, compositions of the invention comprise at least one urethane (meth)acrylate (b1) and at least one polyester (meth)acrylate, more in particular at least one polyester (meth)acrylate (b2) as described above.

In an embodiment of the invention, compositions of the invention comprise two or more different compounds (b), that typically are selected from two or more of the group of urethane (meth)acrylates (b1), polyester (meth)acrylates (b2), polyepoxy (meth)acrylates (b3), polyether (meth)acrylates (b4), polycarbonate (meth)acrylates (b5) and/or poly (meth)acrylic (meth)acrylates (b6) as described above. Possibly two urethane (meth)acrylates (b1) of a different type are present.

In a preferred embodiment of a composition of the invention, the amount of (meth)acrylate functionality expressed on the whole solid composition (a) and (b) is 0.2 to 8 meq/q, more preferably 0.3 to 7 meq/q, even more preferably 0.4 to 6 meq/q, most preferably 0.5 to 5 meq/g.

The mixture of (a) and (b) is optionally mixed with one or more photo initiators (c2), at times after removal of some of the auxiliary solvent employed and/or after partial neutralization of the amino groups with acids, preferably with formic, acetic or lactic acid. Said photo initiator (c2) can be the same or different from the photo initiator (c1). Examples of suitable photo initiators are Irgacure® 500 and Irgacure 819DW, Esacure KIP EM, Esacure DP 250.

Amino groups of (a) and possibly of (b) are typically protonated with an acid. Said acid is preferably selected from the list formic acid, acetic acid, lactic acid, or mixtures thereof.

In a preferred embodiment of a process according to the invention, the (meth)acrylic modified amine epoxy adduct material (a) is prepared as follows based on an epoxy resin-amine adduct (A) and a (meth)acrylate copolymer (B):

(A) 3 to 30% by weight, based on the solids, of a basic adduct of epoxy resins, which has an amine number of 50 to 170 mg KOH/g and is preferably present as a 10 to 40% strength by weight solution in a (preferably water-dilutable) solvent which is inert to the reaction (component A), and (B) 70 to 97% by weight of a monomer mixture which comprises (Ba) 7 to 20% by weight of esters of (meth)acrylic acid which contain secondary or tertiary amino groups, preferably tertiary amino groups, (Bb) 15 to 30% by weight of monoesters of (meth)acrylic acid with diols, which contain alkylene radicals having 2 to 6 carbon atoms and/or oxyalkylene radicals having 4 to 12 carbon atoms, (Bc) 50 to 78% by weight of (meth)acrylic acid alkyl esters, the alkyl radicals of which contain 1 to 18 carbon atoms, and (Bd) up to 10% by weight of aromatic vinyl monomers (component B), are subjected to free radical polymerization to provide (AB), and the thus obtained (AB) is at least partially neutralized to provide (a)

with the provisos that component (AB) has an amine number of 30 to 90 mg KOH/g and a hydroxyl number of 80 to 150 mg KOH/g, and that the sums of the percentage figures of components (A) and (B), respectively (Ba) to (Bd), are in each case 100.

In a preferred embodiment the components (A) and (B) in each case comprise at least 5% by weight of identical aliphatic moieties having 7 to 18 carbon atoms.

In a preferred embodiment of a process of the invention, N-monoalkyl- or N-dialkyl-aminoalkyl (meth)acrylates or the corresponding N-alkanol compounds are employed as component (Bb).

In a preferred embodiment of a process of the invention, component (A) is present in an amount of from 5 to 20% by weight and has an amine number of 90 to 130 mg KOH/g, component (B) is present at from 80 to 95% by weight, and the amine number of component (AB) is from 40 to 70 mg KOH/g.

The component (AB) can be partially neutralized to provide (a) before or after mixing with component (b). An aqueous coating composition can be obtained by either in a first step at least partially neutralizing (AB) to provide (a) and to mix it with (b); or alternatively to first mix (AB) with (b) and then at least partially neutralizing (AB) to provide (a). Preferably only the amount of water required for neutralization of the cationic groups with an acid is used.

This coating composition is finally diluted, in a known manner, with deionized water to a solids content suitable for further processing. The subsequent process steps for the preparation of coatings are known to one skilled in the art.

It is possible to use the composition as such; alternatively any solvent present in the composition may be removed.

Additives usually used in coating compositions such as flow modifiers or leveling agents and pigments may be added to the composition.

Optionally further components can be added to the aqueous coating compositions of the invention. For further improvement of corrosion resistance of cationic electrodeposition (CED) applied coatings, reaction products of bismuth oxide with alkyl sulfonic acid, lactic acid or dimethylol propionic acid can be used.

If the substrate is not heat sensitive then a dual cure is possible. For that purpose crosslinking components (C) can be added. Components (C) are typically hydrophilic or hydrophobic crosslinking agents which effect curing by transesterification, transetherification or transurethanization, of the coating films which are deposited. Suitable external crosslinking components (C) are (blocked) polyisocyanates and/or amino resins (brand name Cymel®).

Optionally a co-solvent can be added that preferentially is chosen from oxygen containing types such as dipropylene glycol methyl ether (Dowanol™ DPM*) and/or diethylene glycol methyl ether (Dowanol™ DM*) (*available from Dow Chemical Company).

The coating composition according to an embodiment of the invention can advantageously be used to be deposited cathodically and cured by ultraviolet radiation. They are particularly suitable for low temperature coating of temperature sensitive materials such as plastics.

The composition and process according to the present invention are advantageous in that they are able to provide dispersions with low volatile organic content (VOC), a high solids content, a low viscosity, a low particle size, an excellent stability and a low film formation temperature. Typically compositions of the invention are characterized by one or more of the following:
- a solid content between 25 wt % and 45 wt %, preferably between 30 wt % and 45 wt %, most preferably between 35 and 45 wt %,
- a Brookfield viscosity between 20 and 2000 mPa·s, preferably between 20 and 1000 mPa·s, most preferably between 20 and 500 mPa·s,
- a pH between 1 and 9, preferably between 3 and 7, most preferably between 4 and 6,
- a mean particle size between 20 and 200 nm, most preferably between 50 and 100 nm,
- a minimum film formation temperature below 20° C., preferably below 10° C., most preferably below 0° C.

The coating composition according to the invention can be applied via standard application techniques well known in the art including spraying, dipping, and rolling. The coating composition can be further diluted with water.

The coating compositions according to the invention are particularly suitable for cationic electrodeposition applications, followed by radiation curing.

The coating compositions are characterized by a higher reactivity and a better compatibility over the compositions know in the art. The coating compositions according to the invention permit to obtain coatings with good mechanical properties as well as an increased adhesion and corrosion resistance.

EXAMPLES

Examples 1-4, Comparative Examples CE1-CE4

Preparation of an Amine Epoxy Adduct (A)

Step I: 103 g of diethylenetriamine were reacted for 4 hours at 60° C. with 577 g 2-ethylhexylglycidether in 170 g methoxypropanol. Then a mixture of 190 g bisphenol A-diglycidylether and 48 g methoxypropanol were added within 2 hours at 60° C. and reacted at this temperature for 3 hours. The solids content of the resulting intermediate was 80%.

Step II: 652 g of the epoxy amine adduct intermediate prepared as described above were reacted with 570 g of a bisphenol A diglycidylether, 77 g 2-ethylhexylamine and 162 g methoxypropanol at 60° C., until all primary NH groups were reacted. Then 1330 g of a 75% solution of bisphenol A diglycidylether in methoxypropanol and 189 g diethanolamine were added, until all NH groups were reacted.

In a last step, 78 g N,N-diethylaminopropylamine were added and reacted at 120° C. until all epoxy groups had reacted. The epoxy determination can be carried out using ISO 3001. The product thus obtained was diluted with methoxypropanol to a solids content of 65%.

Preparation of Acryl Modified Epoxy Amine Adduct (AB)

308 parts of the amine epoxy adduct prepared as described above and 444 parts of methoxypropanol were mixed and warmed up to 85° C. Over 4 hours, a mixture consisting of 84 parts dimethylaminoethylmethacrylate, 159 parts 2-hydroxyethylmethacrylate, 306 parts of n-butylmethacrylate, 106 parts methylmethacrylate, 145 parts 2-ethylhexylacrylate, 24 parts of azobisisobutyronitrile and 2 parts of dodecylmercaptane were added over 4 hours. Then the temperature was raised to 90° C. and kept for 2 hours. Then 10 more parts of azobisisobutyronitrile were added and the reaction mass was kept at 90° C., until the content of free monomers was below 0.5%; measurable by gas chromatography. The resulting acryl modified epoxy amine adduct is a acrylic modified epoxy-amine adduct with 20% epoxy-amine and 80% acrylic modification.

Urethane Acrylates (b)

(b1) Ebecryl®220 which is an Allnex proprietary urethane acrylated based on aromatic polyisocyanate.

(b2) Ebecryl®1290 which is an Allnex proprietary urethane acrylated based on aliphatic polyisocyanate.

UV Curable Electrodeposition Coating Compositions

Example 1 (1.1 and 1.2)

740 parts (AB) and 320 parts (b1) corresponding with a solids ratio (AB) to (b) of 60:40 were neutralized with 48 parts of acetic acid 30% in water to provide a mixture (a1)+(b1). Then portions of water were added at 50° C. under stirring with a shear rate of about 140 per seconds, until a solids content of 40% by weight was reached.

The particle size as measured with a Malvern Zetasizer was 175 nm. The product obtained is denominated as 1.1. The 40% solution was diluted further to 15% with water (denominated 1.2).

Example 2 (2.1 and 2.2)

To samples of the dispersion prepared as described above without initiator (1.1 and 1.2), 32 g of a photo initiator Irgacure® 500 was added. The samples with solids content of respectively 40% and 15% are denominated as 2.1 and 2.2.

Example 3 (3.1 and 3.2)

370 parts (AB) and 560 parts (b2) corresponding with a solids ratio (AB):(b2) of 30:70 are neutralized with 50 parts of lactic acid 30% in water. Then portions of water are added at 50° C. under stirring with a shear rate of 140 per seconds, until a solids content of 40% is reached. The dilution to 15% solids content was performed as in Experiments 1 and 2. The products obtained, without photo initiator are named 3.1 and 3.2.

Example 4 (4.1 and 4.2)

To samples obtained under experiment 3, 32 g of a photo initiator Irgacure®500 was added. The resulting samples are named 4.1 and 4.2.

Comparative Experiments (CE1-CE4)

A composition was prepared according to example 1 of U.S. Pat. No. 6,232,364 B1, with and without initiator. Samples CE1 and CE3 stand for a 40 wt % solids sample, respectively without and with photo initiator. Samples CE2 and CE4 stand for a 15 wt % solids sample, respectively without and with photo initiator.

In a four-necked flask equipped with a stirrer, condenser, thermometer and dropping funnel at each neck were placed 200 g of the trimer (isocyanurate) of hexamethylene diisocyanate and 135 g of xylene. A mixture of 116 g of 2-hydroxyethyl acrylate; 0.46 g of dibutyltin dilaurate as a catalyst and 0.1 g of methoquinone as a polymerizing inhibitor was dropwise added through the dropping funnel with stirring over 10 minutes at a fixed rate. The mixture was further stirred for 90 minutes, with keeping the temperature at 40° C. or lower, to give an intended acrylate solution. The completion of the reaction of the isocyanate group was confirmed by disappearance of the peak at 2270 cm$^{-1}$ by infrared absorption spectra.

To 300 g of isopropyl alcohol as a solvent were added 40 g of dimethylaminoethyl methacrylate, 100 g of 2-hydroxyethyl methacrylate, 90 g of 2-ethylhexyl acrylate, 50 g of n-butyl methacrylate and 145 g of methyl methacrylate, and 75 g of styrene. Then, the combination photopolymeriation initiators namely, 1 g of 1-hydroxy-cyclohexyl phenyl ketone and 4 g of 2-hydroxy-2-methyl-1-phenylpropan-1-one were added for those samples comprising a photo initiator (samples CE3 and CE4).

The resulting mixture was placed in a 4-necked flask equipped with a stirrer and so on in the same way as described in the first paragraph and warmed up with stirring. After starting of flux, an equal amount of the mixture of the same component was drop wise added through the dropping funnel homogeneously over 90 minutes, and the mixture was stirred at 85° C. for 4 hours to give a solution of the copolymer resin having the cationic electrodeposition property. The average molecular weight of this copolymer was 26000, which was confirmed by GPC.

The copolymer solution (91 g) prepared as described in the previous paragraph was neutralized with 1.9 g of lactic acid. There was added the acrylate solution (71.4 g) prepared in accordance with the first paragraph and 1 g of 2-hydroxy-2-methylpropiophenone as a photopolymerization initiator with stirring. Then, the mixture was made to 1 liter in total by addition of ion-exchange water with stirring to give the ultraviolet curable coating composition for cationic electrodeposition.

Performance Tests

The 40% coating compositions (1.1, 2.1, 3.1, 4.1, CE1 and CE3) were tested as follows: a drawdown on glass with a wet film thickness of 300 μm was predried for 5 minutes at 90° C. and then UV cured (Hg-lamp with standard conditions: 120 W/cm and a speed of 5 m/min) to give a dry film thickness of 80 μm. The film is tackfree and has a pendulum hardness of 25 s. The adhesion on glass was very good.

The 15% solutions (1.2, 2.2, 3.2, 4.2, CE2 and CE4) were deposited by cationic electrodeposition at 100 V for 2 minutes on Zn phosphate panels. The electrodeposited film was predried at 90° C. and UV cured under the same conditions as in the drawdown test. The adhesion, as measured by a crosscut test, was excellent (value o); the coated panels were tested in the salt spray chamber following ASTM-B 117-64. This gave a delamination of 3 mm after 500 hours.

TABLE 1

Performance tests on different substrates

| Example | Initiator (Y/N) | Solids content (%) | Coatings application | Particle size (nm) | Pendulum hardness (s) | Glass adhesion | Metal adhesion, cross cut | Salt spray test 500 h, delamination (mm) |
|---|---|---|---|---|---|---|---|---|
| 1.1 | N | 40 | drawdown (glass) | 175 | 25 | Good | | |
| 1.2 | N | 15 | electrodeposition (steel panels) | 170 | | | 0-1 | 3 |
| 2.1 | Y | 40 | drawdown (glass) | 160 | 140 | Good | | |
| 2.2 | Y | 15 | electrodeposition (steel panels) | 165 | | | 0 | 1 |
| 3.1 | N | 40 | drawdown (glass) | 150 | 20 | Good | | |
| 3.2 | N | 15 | electrodeposition (steel panels) | 150 | | | 0 | 4 |
| 4.1 | Y | 40 | drawdown (glass) | 155 | 130 | Good | | |
| 4.2 | Y | 15 | electrodeposition (steel panels) | 155 | | | 0 | 2 |
| CE1 | N | 40 | drawdown (glass) | 140 | sticky | No | | |
| CE2 | N | 15 | electrodeposition (steel panels) | 140 | | | None | Full delamination |
| CE3 | Y | 40 | drawdown (glass) | 140 | 90 | Medium | | |
| CE4 | Y | 15 | electrodeposition (steel panels) | 140 | | | 1 | 25 |

Examples 5-6 and Comparative Examples CE5 and CE6

Example 5 is the 40% dispersion of Example 1; i.e. without photo initiator.

Example 6 is the 40% dispersion of Example 5, to which 32 g of a photo initiator Irgacure® 500 was added.

These compositions were compared to a composition prepared according to example 1 of U.S. Pat. No. 6,232,364 B1 as previously described. The composition obtained, with initiator, is referred to as comparative example 5, abbreviated CE5.

Comparative composition CE6 is based on the non modified pure amino epoxy adduct (A) as described in example 1 (first part):

740 g of the amine epoxy product (A) and 320 parts of (b2) corresponding to a solids ration of A to (b2) of 60:40 were neutralized with 48 parts of acetic acid 30% in water to provide a mixture. Then portions of water were added at 50° C. under stirring with a shear rate of about 140 per seconds, until a solids content of 40% by weight was reached. The particle size as measured with a Malvern Zetasizer was 195 nm. The 40% solution was diluted further to 15% with water.

To the sample as described above, 32 g of photo initiator Irgacure® 500 was added.

Performance tests were conducted on coatings obtained from the above described compositions. The pendulum hardness was tested. Corrosion resistance was tested according to ASTM B 117 for a coating deposited on Zn phosphate steel and on blank steel, 15 μm dry film thickness. The results were as summarized in Table 2.

TABLE 2

Performance tests on different substrates

| Test | Ex 5 | Ex 6 | CE5 | CE6 |
|---|---|---|---|---|
| Appearance | good | good | good | good |
| Uniformity | good | good | good | Good |
| Pendulum hardness on glass plate (s) | 25 | 150 | 90 | 70 |
| Corrosion resistance Zn phosphate steel (h) | 360 | 500 | 120 | 240 |
| Corrosion resistance Zn blank steel (h) | 120 | 120 | 24 | 24 |

Example 7

7.1 Alternative Modified Epoxy Resin-Amine Adducts 7.1.1 Preparation of Modifiers Carrying Aliphatic Groups (V1 to V3)

Modifier (V1): 577 g (3.1 mol) of 2-ethylhexyl glycidyl ether are added to a solution of 103 g (1 mol) of diethylenetriamine and 170 g of methoxypropanol at 60° C. in the course of 2 hours, and the mixture is reacted. A mixture of 190 g of a bisphenol A epoxy resin (epoxide equivalent weight of the epoxy resin (EEW) of about 190) and 48 g of methoxypropanol is then added at 60° C. in the course of 2 hours. The solid resin content is 80% by weight.

Modifier (V2): 1010 g (3.1 mol) of stearyl glycidyl ether in 129 g of methoxypropanol are added to a solution of 103 g (1 mol) of diethylenetriamine and 150 g of methoxypropanol at 60° C. in the course of 2 hours. A mixture of 190 g of a bisphenol A epoxy resin (EEW 190) and 48 g of methoxypropanol is then added at 60° C. in the course of 2 hours. The solid resin content is 80% by weight.

Modifier (V3): 372 g (2 mol) of ethylhexyl glycidyl ether are added to a solution of 104 g (1 mol) of aminoethylethanolamine and 119 g of methoxypropanol at 60° C. in the course of 2 hours. The solid resin content is 80% by weight.

7.1.2. Preparation of Further Components (A): (A1) to (A4)

Component (A1): 652 g (0.6 mol) of modifier (V1), 80% strength, 570 g of a bisphenol A diepoxy resin (EEW 190), 77 g (0.6 mol) of 2-ethylhexylamine and 162 g of methoxypropanol are reacted at 60° C. in a first reaction stage in a suitable reaction vessel until the NH-functionality has been converted completely. 1357 g (2 mol) of a 70% strength solution of a bisphenol A diepoxy resin (EEW 475) in methoxypropanol and 189 g (1.8 mol) of diethanolamine are then added, and the mixture is again reacted until the NH-functionality has been converted. In a third reaction stage, the remaining oxirane groups are reacted with 78 g (1.66 mol) of N,N-diethylaminopropylamine at 60° C. for 2 hours, at 90° C. for a further hour and at 120° C. for a further 3 hours, and the mixture is diluted with methoxypropanol to a solid resin content of 65% by weight.

Components (A2) to (A4): Components (A2) to (A4) are prepared in the same manner as in (A1) from the data summarized in Table 3. In the case of component (A3), reaction stage 4 is carried out such that after reaction stage 3, methoxypropanol and a polyoxypropylene glycol diglycidyl ether (EEW 200, commercial name DER® 736, Dow Chemical) are added at 120° C. and this temperature is maintained for 3 to 5 hours.

Component (A5): 500 g of a bisphenol A diepoxy resin (EEW about 500) are dissolved in 214 g of methoxypropanol and reacted with 83 g (0.3 mol) of a half-ester of phthalic anhydride and 2-ethylhexanol at 110 DEG C. in the presence of 0.5 g of triethylamine as a catalyst, to an acid number of less than 3 mg KOH/g. 120 g (0.4 mol) of an NH-functional oxazolidine of aminoethylethanolamine, 2-ethylhexyl acrylate and formaldehyde, and 26 g (0.2 mol) of diethylaminopropylamine are then added, and the batch is reacted at 80° C. The batch is diluted with 181 parts of methoxypropanol to a solid resin content of 70% by weight.

The parameters for all the products (A1) to (A5) are summarized in Table 4.

7.2. Preparation of Further Components (AB): AB1 to AB10

Component (AB1): 308 parts of component (A1), 65% strength, and 444 parts of methoxypropanol are heated to 85° C. in a reaction vessel which is suitable for free radical polymerization and is equipped with a stirrer, reflux condenser, feed vessel, nitrogen flushing and temperature measurement. A mixture of 84 parts of dimethylaminoethyl methacrylate, 159 parts of 2-hydroxyethyl methacrylate, 306 parts of n-butyl methacrylate, 106 parts of methyl methacrylate, 145 parts of 2-ethylhexyl acrylate, 24 parts of azobisisobutyronitrile and 2 parts of tert-dodecylmercaptan is then added uniformly in the course of 4 hours. The temperature is then increased to 90° C. and kept at this value for 2 hours. After addition of a further 10 parts of azobisisobutyronitrile, the batch is kept at 90° C. for a further 3 hours, to a degree of polymerization of at least 99.5%.

Further components (AB2 to AB10) are prepared according to the proportions shown in Table 5 in the same manner. The parameters for all the products are also summarized in Table 5. Explanation of the abbreviations in Table 5:

DAMA dimethylaminoethyl methacrylate
BAMA N-tert-butylaminoethyl methacrylate
HEMA 2-hydroxyethyl methacrylate
HEA 2-hydroxyethyl acrylate HBA 4-hydroxyethyl acrylate
TGMA tripropylene glycol methacrylate
MMA methyl methacrylate
BMA n-butyl methacrylate
BA n-butyl acrylate
EHA 2-ethylhexyl acrylate
SMA stearyl methacrylate
ST styrene
DDM tert-dodecylmercapto (regulator)
AIBN azobisisobutyronitrile (starter)

TABLE 3

Preparation of additional components (A)

| Component | A1 | A2 | A3 | A4 |
|---|---|---|---|---|
| Stage 1 | | | | |
| V1 solution (80% strength in MP) | 652 | 652 | 325 | — |
| V2 solution (80% strength in MP) | — | — | — | 489 |
| Epoxy resin EEW 190 | 570 | 722 | 380 | 570 |
| 2-Ethylhexylamine | 77 | 122 | 65 | — |
| Stearylamine | — | — | — | 202 |
| Methoxypropanol (MP) | 162 | 455 | 237 | 193 |
| Stage 2 | | | | |
| Epoxy resin EEW 475 (75% strength in MP) | 1330 | 1837 | 1647 | 1330 |
| Methoxypropanol | — | 268 | 223 | — |
| V3 solution (80% strength in MP) | — | 952 | 536 | — |
| Monoethanolamine | — | — | 68 | — |
| Diethanolamine | 189 | — | — | 189 |
| Stage 3 | | | | |
| N,N-Diethylaminopropylamine | 78 | 143 | 78 | 78 |
| Methoxypropanol | — | 61 | 33 | — |
| Stage 4 | | | | |
| Epoxy resin EEW 200 | — | — | 132 | — |
| Methoxypropanol | — | — | 57 | — |

TABLE 4

Parameters for components (A1) to (A5)

| Component | A1 | A2 | A3 | A4 | A5 |
|---|---|---|---|---|---|
| Solid resin content (% by weight) | 65 | 65 | 70 | 65 | 70 |
| Amine number (mg KOH/g of solid resin) | 124 | 125 | 112 | 107 | 92 |
| Hydroxyl number (mg KOH/g of solid resin) | 257 | 214 | 220 | 228 | 77 |
| % by weight of ethylhexyl radicals | 11.0 | 18.6 | 14.5 | — | 10.8 |
| % by weight of stearyl radicals | — | — | — | 18.5 | — |

TABLE 5

Recipes for further preparations of components (AB)

| | AB1 | AB2 | AB3 | AB4 | AB5 | AB6 | AB7 | AB8 | AB9 | AB10 |
|---|---|---|---|---|---|---|---|---|---|---|
| (A1) (65%) | 308 | 77 | — | — | — | — | 154 | — | — | — |
| (A2) (65%) | — | — | 154 | 462 | — | — | — | — | — | — |
| (A3) (70%) | — | — | — | — | 143 | 214 | — | — | — | — |
| (A4) (65%) | — | — | — | — | — | — | — | 154 | 77 | — |
| (A5) (70%) | — | — | — | — | — | — | — | — | — | 214 |
| Methoxypropanol | 444 | — | 501 | 280 | 515 | — | 503 | 501 | 532 | 491 |
| Butoxyethanol | — | 530 | — | — | — | 489 | — | — | — | — |
| DAMA | 84 | — | 80 | 112 | 67 | 107 | 73 | — | 115 | 98 |
| BAMA | — | 180 | — | — | — | — | 140 | — | — | — |
| HEMA | 159 | 250 | — | — | 200 | 235 | — | — | 240 | 205 |
| HEA | — | — | — | 168 | — | — | 228 | — | — | — |
| HBA | — | — | 154 | — | — | — | — | 205 | — | — |
| TGMA | — | — | — | — | 70 | — | — | — | — | — |
| MMA | 106 | — | 300 | 130 | 248 | — | 249 | — | 260 | 180 |
| BMA | 306 | 280 | — | 160 | 100 | 263 | 250 | 295 | — | 200 |
| BA | — | — | 100 | — | — | — | — | — | 230 | — |
| EHA | 145 | 200 | 266 | 130 | 215 | 185 | 100 | — | — | 167 |
| SMA | — | — | — | — | — | — | — | 180 | 105 | — |
| ST | — | 40 | — | — | — | 60 | — | 80 | — | — |
| DDM | 2 | 3 | 2 | — | 2 | 3 | — | 2 | 3 | 2 |
| AIBN | 24 | 32 | 28 | 35 | 34 | 27 | 34 | 30 | 35 | 28 |
| Parameters | | | | | | | | | | |
| Amine number (mg KOH/g) | 55 | 60 | 41 | 77 | 35 | 55 | 38 | 53 | 46 | 49 |
| Hydroxyl number (mg KOH/g) | 119 | 120 | 81 | 145 | 113 | 134 | 136 | 103 | 115 | 100 |
| Solid resin content (%) | 65 | 65 | 65 | 70 | 65 | 65 | 65 | 65 | 65 | 65 |
| Content of 2-Ethylhexyl radicals in the acrylate portion (% by weight) | 11.1 | 12.9 | 18.2 | 11.4 | 14.7 | 13.4 | 6.1 | — | — | 10.3 |
| Content of stearyl radicals in the acrylate portion (% by weight) | — | — | — | — | — | — | — | 13.5 | 7.9 | — |

The combination of those components AB1 to AB10 provide similar results when combined with the ethylenically unsaturated compounds (b) as described here above.

The invention claimed is:

1. A radiation curable electrodepositable coating composition (a)+(b), comprising an aqueous dispersion of:
   (i) a dispersing polymer (a) consisting essentially of an at least partially neutralized (meth)acrylic modified amine epoxy adduct (AB), and
   (ii) at least one ethylenically unsaturated compound (b) which is a urethane (meth)acrylate (b1), and
   (iii) optionally a photo initiator (c),
      wherein the (meth)acrylic modified amine epoxy adduct (AB) is at least one selected from the group consisting of
   a blend of an amine epoxy adduct (A) with at least one (meth)acrylic (co)polymer, and
   a reaction product of an amine epoxy adduct (A) and at least one (meth)acrylic monomer, which is obtained by polymerizing the at least one (meth)acrylic monomer in the presence of the amine epoxy adduct (A),
   wherein the amine epoxy adduct (A) has an amine number of from 50 mg KOH/g to 170 mg KOH/g, and
   wherein the urethane (meth)acrylate (b1) is a reaction product of
   an active hydroxyl-containing ethylenically unsaturated compound having an acrylate or methacrylate unsaturation, and
   a polyisocyanate.

2. The composition according to claim 1, wherein the (meth)acrylic modified amine epoxy adduct (AB) comprises structural elements derived from (meth)acrylic monomers the mass of which is 20-95 wt % based on the total mass of monomers present in (AB), and
   wherein the (meth)acrylic modified amine epoxy adduct (AB) has an amine number of 20-150 mg KOH/g.

3. The composition according to claim 1, comprising from 20 to 80 wt % of (a) and from 80 to 20 wt % of (b), relative to the total weight of (a) and (b).

4. The composition according to claim 1, wherein the dispersing polymer (a) consisting essentially of the at least partially neutralised methacrylic modified amine epoxy adduct (AB) is obtained by polymerising at least one (meth) acrylic monomer in the presence of an epoxy resin-amine adduct (A), wherein
   (A) 3 to 30% by weight, based on the mass of solids of (a), of a basic amine epoxy adduct (A), which has an amine number of 50 to 170 mg KOH/g and is present as a 10 to 40% strength by weight solution in a water-dilutable solvent which is inert to the reaction (component A), and
   (B) 70 to 97% by weight of a monomer mixture (component B) which comprises:
      (Ba) 7 to 20% by weight of esters of (meth)acrylic acid, which contain secondary or tertiary amino groups,
      (Bb) 15 to 30% by weight of monoesters of (meth) acrylic acid with diols, which contain alkylene radicals having 2 to 6 carbon atoms and/or oxyalkylene radicals having 4 to 12 carbon atoms,
      (Bc) 50 to 78% by weight of (meth)acrylic acid alkyl esters, the alkyl radicals of which contain 1 to 18 carbon atoms,
      and (Bd) up to 10% by weight of aromatic vinyl monomers, are subjected to free radical polymerization to provide component (AB),
   wherein component (AB) before or after mixing with the at least one ethylenically unsaturated compound (b) has been at least partially neutralized,
   with the provisos that component (AB) has an amine number of 30 to 90 mg KOH/g and a hydroxyl number of 80 to 150 mg KOH/g, and
   the sum of the masses of (A) and (B) is 100% by weight of component (AB), and the sum of the masses of (Ba) to (Bd) is 100% by weight of component (B).

5. The composition according to claim 1, wherein components (A) and (B) each comprises at least 5% by weight of identical aliphatic moieties having 7 to 18 carbon atoms.

6. The composition according to claim 1, wherein (b1) is the reaction product of the polyisocyanate and the active hydroxyl-containing ethylenically-unsaturated compound having an acrylate unsaturation.

7. The composition according to claim 1, wherein the amount of (meth)acrylic functionality of (b1) is between 1 and 10 meq/g.

8. A process for the preparation of a non-aqueous water-dilutable composition (AB) +(b) for the preparation of an aqueous coating composition (a)+(b) which can be deposited cathodically and is curable by radiation, comprising the steps of:
   adding an ethylenically unsaturated compound (b) to a (meth)acrylic modified amine epoxy adduct material (AB) comprising structural elements derived from (meth)acrylic monomers the mass of which is 20-95 wt % of the total mass of monomers in (AB), and wherein the (meth)acrylic modified amine epoxy adduct (AB) has an amine number of 20-150 mg KOH/g in a non-aqueous water-dilutable solvent (d),
   optionally adding a photo initiator (c1),
   using an amount from 20 to 80 wt % of (AB) and from 80 to 20 wt % of compound (b), expressed relative to the total weight of (AB) and (b),
   wherein the (meth)acrylic modified amine epoxy adduct material (AB) is prepared as follows based on an epoxy resin-amine adduct (A) and a (meth)acrylate copolymer (B):
      (A) 3 to 30% by weight, based on the mass of solids, of an epoxy resin-amine adduct (A), which has an amine number of 50 to 170 mg KOH/g, and is present as a 10 to 40% strength by weight solution in a non-aqueous water-dilutable solvent which is inert to the reaction (component A), and
      (B) 70 to 97% by weight of a monomer mixture which comprises
         (Ba) 7 to 20% by weight of esters of (meth)acrylic acid, which contain secondary or tertiary amino groups,
         (Bb) 15 to 30% by weight of monoesters of (meth) acrylic acid with diols, which contain alkylene radicals having 2 to 6 carbon atoms and/or oxyalkylene radicals having 4 to 12 carbon atoms,
         (Bc) 50 to 78% by weight of (meth)acrylic acid alkyl esters, the alkyl radicals of which contain 1 to 18 carbon atoms, and
         (Bd) up to 10% by weight of aromatic vinyl monomers (component B), are subjected to free radical polymerization, and the combination (AB) thus obtained is at least partially neutralized thereby providing (a),
   wherein the ethylenically unsaturated compound (b) is at least one urethane (meth)acrylate (b1) made from compounds having at least one acrylic or methacrylic group, and at least one hydroxyl group, and from aliphatic, cycloaliphatic, aromatic or heterocyclic polyisocyanates having at least two isocyanate groups, with the provisos that component (AB) has an amine number of 30 to 90 mg KOH/g and a hydroxyl number of 80 to 150 mg KOH/g, and that the sum of the masses of (A) and (B) is 100% by weight of the component (AB), and the sum of the masses of (Ba) to (Bd) is 100% by weight of the component (B).

9. A process for the preparation of an aqueous coating composition (a)+(b) which can be deposited cathodically and cured by ultraviolet radiation, comprising the steps of:
preparing a non-aqueous water-dilutable composition (AB)+(b) according to the process of claim 8,
optionally adding a photo initiator (c2), which can be the same or different from the photo initiator (c1) added to prepare the water-dilutable composition (AB)+(b),
at least partially neutralizing the amino groups of (AB), thereby providing (a),
diluting the combination (a)+(b) thus obtained with deionized water to a solids content suitable for further processing.

10. The process according to claim 9, wherein the photo initiator is selected from the group consisting of a benzophenone; 1-hydroxy-cyclohexyl phenyl ketone; 2,4,6-trimethyl benzophenone; 3,3-dimethyl-4-methoxy-benzophenone; benzyl dimethyl ketal; oligo (2-hydrox-2-methyl-1-(4-(1-methyl-vinyl)phenyl)propanone; 2,2-dimethoxy-1,2-diphenylethan-1-one; 2-hydroxy-2-methyl-1-phenylpropan-1-one; bis (2,4,6-trimethylbenzoyl)phenyl phosphine oxide; 2,4-diethylthioxanthone; ethyl p-dimethylaminobenzoate; isoamyl p-dimethylaminobenzoate; bis ($\eta^5$-2,4-cyclopentadien-1-yl)-bis(2,6-difluoro-3-(1H-pyrrol-1-yl)-phenyl) titanium; and mixtures thereof.

11. A composition prepared according to claim 8.

12. A method of applying a composition onto a metallic material, a metal plated material, or an electrically conductive plastic material, comprising applying the composition according to claim 1 onto said material.

13. The process according to claim 9, wherein component (AB) is at least partially neutralized with an acid.

* * * * *